US006568932B1

(12) United States Patent
Murai

(10) Patent No.: US 6,568,932 B1
(45) Date of Patent: May 27, 2003

(54) DEVICE AND METHOD FOR FORMING VEGETABLE FIBER MATERIAL

(75) Inventor: Yoshiichi Murai, 5-1, Shimizu-cho, Seki-shi, Gifu 501-3977 (JP)

(73) Assignees: Yoshiichi Murai, Kyoto (JP); Open Industries Co., Ltd., Gifu (JP)

( * ) Notice: Subject to any disclaimer, the term of this patent is extended or adjusted under 35 U.S.C. 154(b) by 0 days.

(21) Appl. No.: 09/720,651

(22) PCT Filed: Jun. 28, 1999

(86) PCT No.: PCT/JP99/03460

§ 371 (c)(1),
(2), (4) Date: Dec. 28, 2000

(87) PCT Pub. No.: WO00/00699

PCT Pub. Date: Jan. 6, 2000

(30) Foreign Application Priority Data

Jun. 29, 1998 (JP) .......................................... 10-181766

(51) Int. Cl.$^{7}$ ......................... B29C 53/04; B29C 53/06; B29C 51/02; B29C 51/32; B29C 53/84

(52) U.S. Cl. .................... 425/305.1; 425/317; 425/340; 425/384; 425/397; 425/398; 425/400; 264/153; 264/295; 264/297.6; 264/322; 264/339; 264/82; 264/83

(58) Field of Search ................................ 264/153, 156, 264/297.6, 322, 82, 83, 292, 339, 295; 425/305.1, 317, 340, 384, 397, 398, 400, 404

(56) References Cited

U.S. PATENT DOCUMENTS

| | | | | |
|---|---|---|---|---|
| 1,471,906 A | * 10/1923 | Longren | 114/355 |
| 1,793,089 A | * 2/1931 | Heyes | 249/66.1 |
| 1,948,314 A | * 2/1934 | Pratt et al. | 264/134 |
| 2,120,137 A | * 6/1938 | Mason | 162/11 |
| 2,255,117 A | * 9/1941 | Helmstaedter | 264/153 |
| 2,291,471 A | * 7/1942 | Hopkins | 144/256.4 |
| 2,398,326 A | * 4/1946 | Reeves | 264/129 |
| 2,548,305 A | * 4/1951 | Gora | 156/242 |
| 3,151,359 A | * 10/1964 | Campbell et al. | 264/275 |
| 3,488,804 A | * 1/1970 | Butcher | 425/297 |
| 3,517,415 A | * 6/1970 | McGrath et al. | 351/178 |
| 4,778,551 A | * 10/1988 | Coffman | 156/224 |
| 4,937,021 A | * 6/1990 | Danforth et al. | 264/153 |

FOREIGN PATENT DOCUMENTS

| | | |
|---|---|---|
| JP | 05-156593 A | * 6/1993 |
| JP | 07-150500 A | * 6/1995 |
| JP | 09-119049 A | * 5/1997 |
| JP | 10-008394 A | * 1/1998 |

* cited by examiner

*Primary Examiner*—Jan H. Silbaugh
*Assistant Examiner*—Michael I. Poe

(57) ABSTRACT

A device and method for forming tableware from biodegradable vegetable fibers includes a device for punching a sheet of vegetable fibers into a preset shape and forming final products from the vegetable fibers. The device and method include a humidifier for humidifying the vegetable fibers, a bender for bend-drawing the vegetable fiber into an intermediate article, a warm-air dryer for keeping and drying the intermediate article, a cool-air dryer for further drying and cooling the intermediate article into a finished article.

8 Claims, 8 Drawing Sheets

DEVICE AND METHOD FOR FORMING VEGETABLE FIBER MATERIAL

TECHNICAL FIELD

The present invention relates to a device for forming tableware such as a spoon, fork, dish, cup or lunch box, or other structural products including containers and the like having a deep-drawn structural portion, as well as daily household goods having the above-mentioned structural portion by means of bend-drawing from vegetable fiber materials, and to a method for forming the above-mentioned products from the vegetable fiber materials.

BACKGROUND ART

It is well known that tableware of disposable type such as a spoon, fork, dish, cup or lunch box, or other structural products including containers and the like having a deep-drawn structural portion, as well as daily household goods having the above-mentioned structural portion have been conventionally provided in volume as plastic formed products. These plastic formed products are exclusively consumed in a disposing manner, so that they become a large amount of garbage after use, which is to be disposed of by means of burning and the like method. The burning process of the above-mentioned plastic formed products has an important problem to be solved that pollutants such as dioxins are generated. Paper cups, paper dishes and the like of disposable type have been produced, however, they are at most paper products and their costs are high, and thus it has been impossible to produce tableware using vegetable fiber materials obtainable from pomace of an apple, bamboo, potato and the like which is well biodegradable.

It is, therefore, an object of the present invention to provide a device for forming the above-mentioned tableware and the like of disposable type by means of the vegetable fiber materials as described above which are easily biodegraded after use to cause no environmental pollution, and to provide a method for forming such tableware and the like of disposable type.

DISCLOSURE OF THE INVENTION

To achieve the above object, invention forms a device for forming vegetable fiber materials in which a sheet member of vce for forming vegetable fiber materials in which a sheet member of vegetable fibers is punched into a preset shape to form a vegetable fiber material S, and a final product G is formed from the vegetable fiber material S, the device comprising:

a first conveying means for sequentially and intermittently conveying the vegetable fiber material S from a supply position to a bend-drawing position;

a humidifying means for humidifying the vegetable fiber material S to give it a preset water content during the period of conveyance by the first conveying means;

a bend-drawing means for bend-drawing the vegetable fiber material S humidified by the humidifying means into an intermediate formed article S' at the bend-drawing position;

a second conveying means for conveying the intermediate formed article S' bend-drawn by the bend-drawing means from the bend-drawing position to a product pickup position;

a warm air drying means for solidifying with warm air the intermediate formed article S' into a final shape during the period of conveyance by the second conveying means; and a cool air drying means for drying with cool air the intermediate formed article S' after warm-air-drying by the warm air drying means to finish into the product G.

Furthermore, the invention forms a device for forming vegetable fiber materials in which a sheet member of vegetable fibers is punched into a preset shape to form a vegetable fiber material, and a final product is formed from the vegetable fiber material, the device comprising:

a turntable as a first conveying means comprising a plurality of material placing portions with a through hole for placing the vegetable fiber material provided at preset central angles, the turntable intermittently rotating at the preset central angle;

a humidifying means for humidifying the vegetable fiber material intermittently rotating by means of the turntable;

a bend-drawing means provided above the turn table, comprising an upper mold for sequentially pressing the humidified vegetable fiber material from above and a lower mold, the lower mold having a mold hole through which the upper mold is to penetrate and cooperating with the upper mold for bend-drawing the vegetable fiber material pushed by the upper mold and penetrating through the through hole of the turntable downwardly;

a second conveying means provided with a plurality of formed article placing portions for holding an intermediate formed article bend-drawn into an intermediate shape as a result of being pushed by the upper mold and penetrating through the lower mold downwardly, the second conveying means intermittently shifting the formed article placing portion;

a warm air drying means for drying with warm air the intermediate formed article intermittently sent by the second conveying means to solidify it into a final shape;

a cool air drying means for drying with cool air the intermediate formed article after warm-air-drying by the warm air drying means to finish into the product.

Furthermore, the invention forms a device for forming vegetable fiber materials in which a sheet member of vegetable fibers is punched into a preset shape to form a vegetable fiber material, and a final product is formed from the vegetable fiber material, the device comprising:

a first turntable comprising a plurality of material placing portions with a through hole for placing the vegetable fiber material provided at preset central angles, the first turn table intermittently rotating at the preset central angle;

a humidifying means for humidifying the vegetable fiber material intermittently rotating by means of the first turn table;

a bend-drawing means PM provided above the first turn table, comprising an upper mold for sequentially pressing the humidified vegetable fiber material from above and a lower mold, the lower mold having a mold hole through which the upper mold is to penetrate and cooperating with the upper mold 6 for bend-drawing the vegetable fiber material pushed by the upper mold and penetrating through the through hole of the first turntable downwardly;

a second turntable provided with a plurality of formed article placing portions at preset central angles for holding an intermediate formed article bend-drawn into an intermediate shape as a result of being pushed by the upper mold and penetrating through the lower mold downwardly, the second turntable intermittently rotating at the preset central angle;

a warm air drying means for drying with warm air the intermediate formed article intermittently sent by the second turntable to solidify it into a final shape;

a cool air drying means for drying with cool air the intermediate formed article after warm-air-drying by the warm air drying means to finish into the product.

Furthermore, the device for forming vegetable fiber materials of this invention, a material sending means for sequentially sending out the vegetable fiber material formed into a preset shape by punching to the material placing portion of the turntable and a product pickup means for picking up the finished product from the formed article placing portion of the second conveying means are provided.

Furthermore, the device for forming vegetable fiber materials of this invention, a stopper guide of a small projecting strip is provided on the top surface of the turntable and along the through hole of the material placing portion.

Furthermore, the device for forming vegetable fiber materials of this invention, the vegetable fiber material is made of pomace obtainable by squeezing vegetables.

Furthermore, the device for forming vegetable fiber materials of this invention, the product is tableware such as a spoon, fork, dish, cup or lunch box, or other structural products including containers having a deep-drawn structural portion, as well as daily household goods having the above structural portion.

Furthermore, a method for forming vegetable fiber materials of this invention, forming a vegetable fiber material having a preset shape by punching a sheet member of vegetable fibers;

humidifying the vegetable fiber material formed into a preset shape to give it a preset water content;

bend-drawing the humidified vegetable fiber material into an intermediate shape;

solidifying the shape into a final shape by warm air drying while keeping the intermediate shape; and cool air drying for finishing.

Furthermore, a method for forming vegetable fiber materials of this invention, the water content and temperature of the vegetable fiber material directly after humidification are set at 50% to 90% and 30° C. to 50° C., respectively.

Furthermore, a method for forming vegetable fiber materials of this invention, the vegetable fiber material is made of pomace obtainable by squeezing vegetables.

BRIEF DESCRIPTION OF THE DRAWINGS

FIG. 6 show an embodiment of bend-drawing a vegetable fiber material using a bend-drawing means consisting of an upper mold and a lower mold in the present device, wherein

FIG. 7 show the embodiment of bend-drawing a vegetable fiber material using the bend-drawing means consisting of the upper mold and the lower mold in the present device, wherein

BEST MODE FOR EMBODYING THE INVENTION

In the following, examples of configurations of a device and a method for forming vegetable fiber materials according to the present invention will be explained in detail on the basis of concrete working examples shown in drawings.

The present invention is a forming device which forms a vegetable fiber material S by punching a sheet of vegetable fibers into a preset shape and forms a final product G from the vegetable fiber material S, and basically comprises a first conveying means CM-1 for conveying the vegetable fiber material S from a supply position P-1 to a bend-drawing position P-2 sequentially and intermittently, a humidifying means 5 for humidifying the vegetable fiber material S to give it a preset water content during the period of conveyance by the first conveying means CM-1, a bend-drawing means PM for bend-drawing the vegetable fiber material S humidified by the humidifying means 5 into an intermediate formed article S' at the bend-drawing position P-2, a second conveying means CM-2 for conveying the intermediate formed article S' bend-drawn by the bend-drawing means PM from the bend-drawing position P-2 to a product pickup position P-3, a warm air drying means 10 for drying with warm air the intermediate formed article S' for solidification into a final shape during the period of conveyance by the second conveying means CM-2 and a cool air drying means 11 for drying with cool air the intermediate formed article S' after warm-air-dried by the warm air drying means 10 for finishing into the product G.

Figure 2:
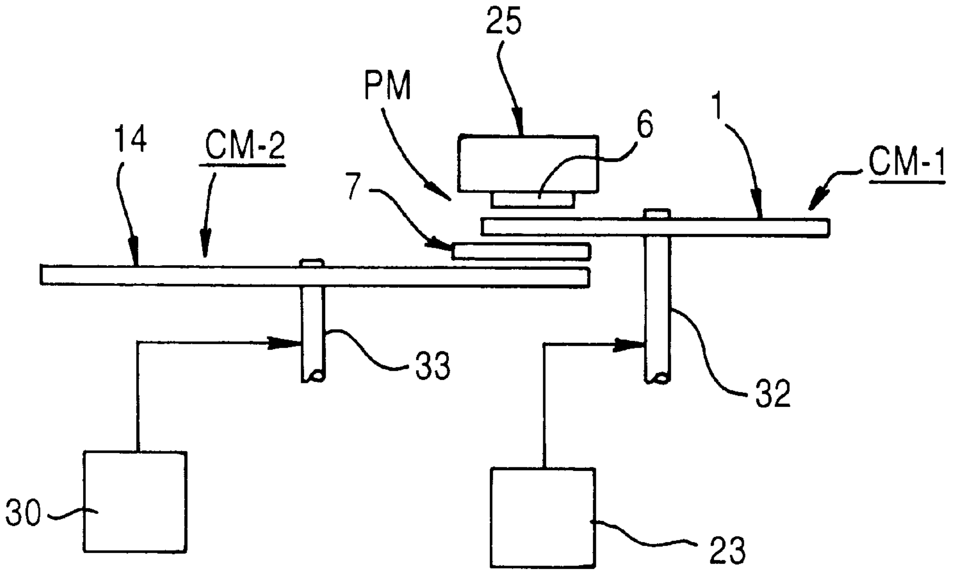
FIG. 2 is a schematic side view showing a device, for explaining the basic configuration of the forming device for vegetable fiber materials according to the present invention.
Figure 3:
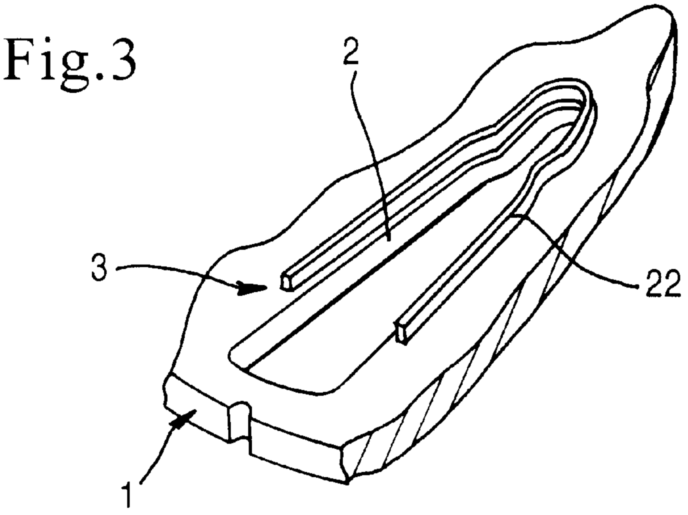
FIG. 3 is a schematic perspective view partially cut away showing details of a material placing portion in a turntable or a first turntable, in one example of a first conveying means in the present device.
Figure 4:
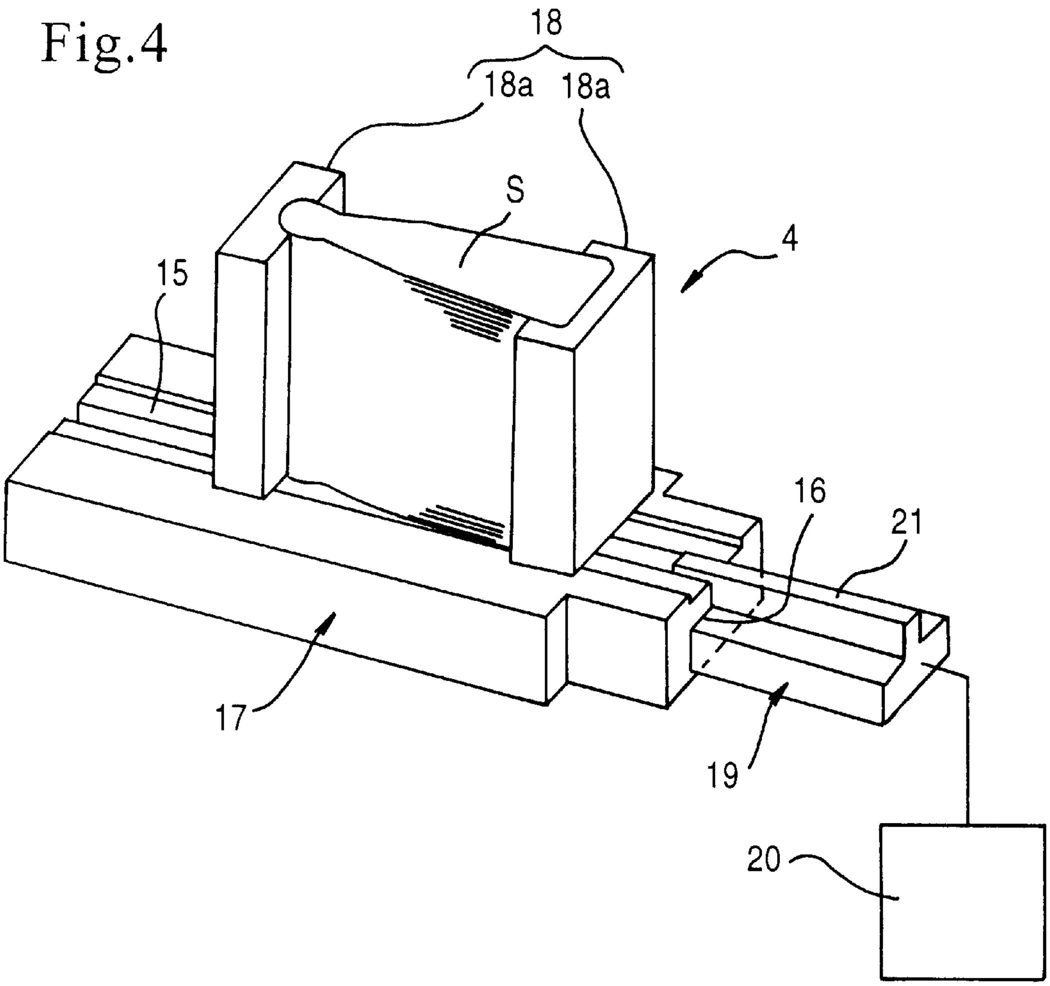
FIG. 4 is a schematic perspective view showing an example of a material sending means for sending out a vegetable fiber material to the turntable in the present device.
Figure 5:
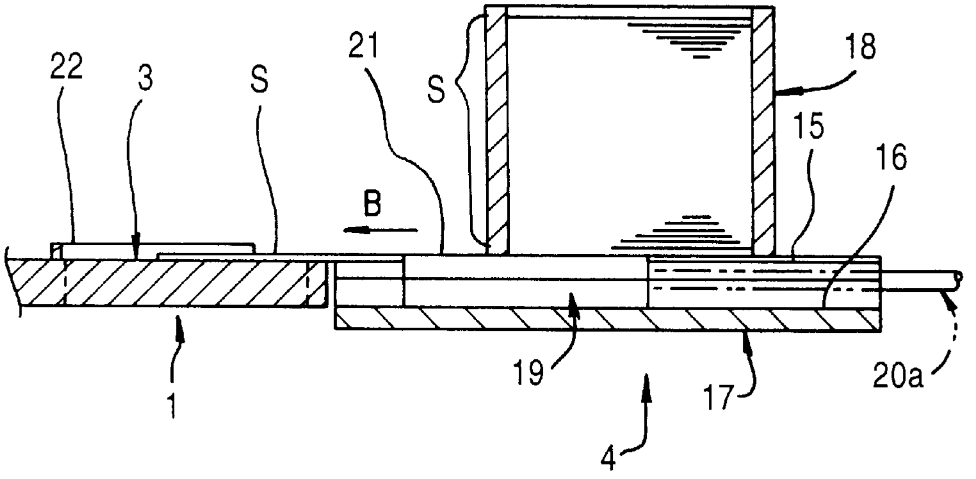
FIG. 5 is a schematic side view showing the state that the vegetable fiber material is being sent out to the turntable in the present device.

FIGS. 1 to 4 show the first embodiment of the device for forming vegetable fiber materials according to the present invention. In the present invention, the vegetable fiber material S is formed by punching a sheet of vegetables fibers into a preset shape, and the device for forming vegetable fiber materials according to the invention is intended to form the final product G from the vegetable fiber material S. In the present invention, the vegetable fiber material S is prepared to have a preset shape punched from a sheet of vegetable fibers, and accommodated, for example, in a sending means 4 configured to be capable of sequentially sending out the vegetable fiber material S one by one, as shown in FIGS. 4 and 5.

Figure 1:
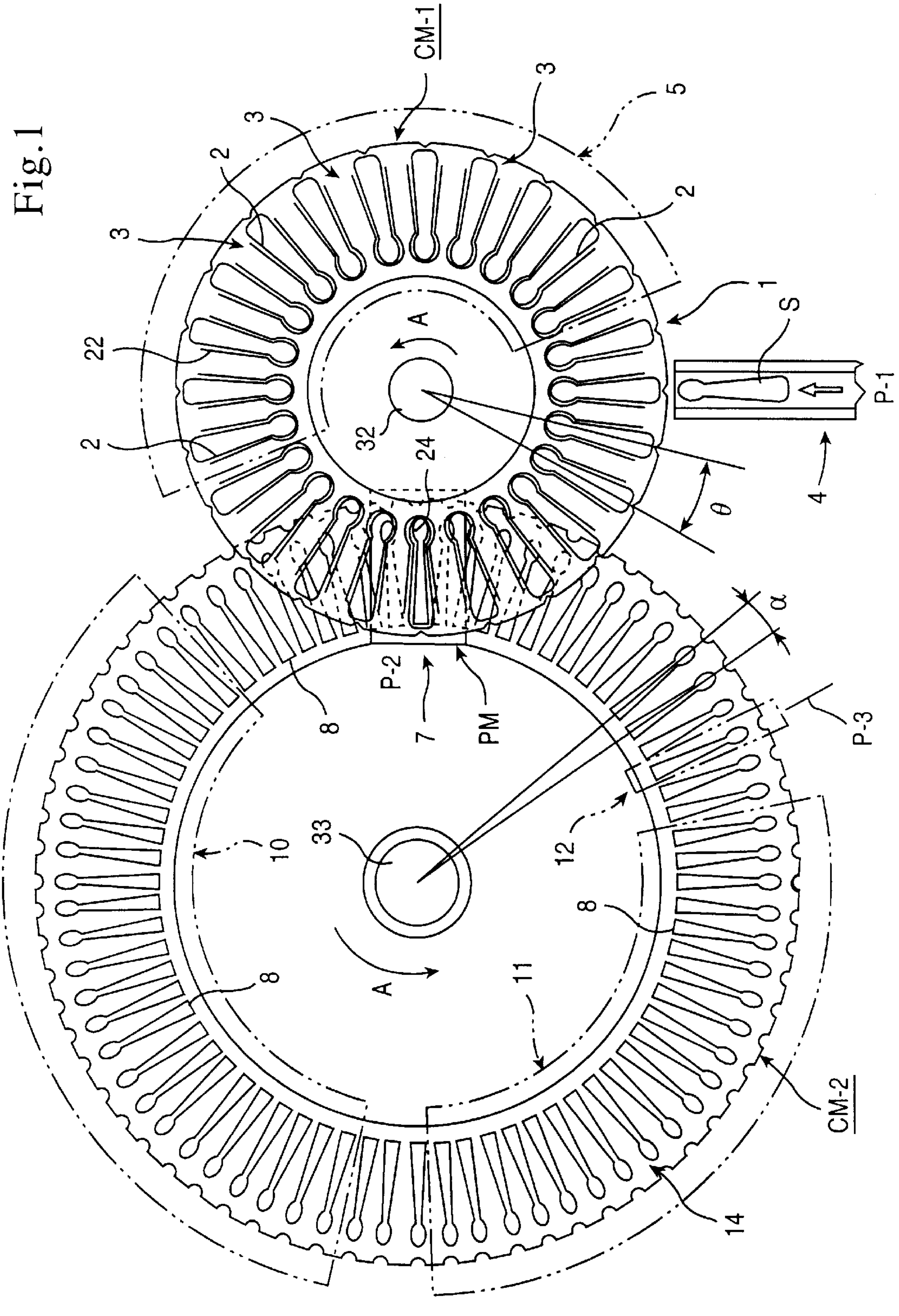
FIG. 1 is a schematic plan view showing an essential part in the first embodiment of a forming device for vegetable fiber materials according to the present invention.

The basic configuration of the device for forming vegetable fiber materials according to the present invention comprises: a turntable 1 provided with a plurality of material placing portions 3 with through holes 2 for placing the vegetable fiber materials S sequentially sent one by one by means of the sending means 4, the turntable 1 intermittently rotating; the humidifying means for humidifying the vegetable fiber materials S intermittently rotating (in the direction of the arrow A) by means of the turntable 1; the bend-drawing means PM consisting of an upper mold 6 and a lower mold 7 for bend-drawing the humidified material S into the intermediate formed article S' having an intermediate shape; the second conveying means CM-2 provided with a plurality of formed article placing portions 8 for holding the intermediate formed article S', the second conveying means CM-2 intermittently shifting the formed article placing portions 8; the warm air drying means 10 for drying with warm air the intermediate formed article S' for solidification into a final shape; the cool air drying means 11 for drying with cool air after warm-air-drying for finishing; and a product pickup means 12 for picking up a finished product from the formed article placing portion 8 of the second conveying means CM-2. Incidentally, in the first embodiment as shown in FIG. 1, the turntable 1 is implemented by a smaller first turntable 13 and the second conveying means CM-2 is implemented by a larger second turntable 14.

In respect of the vegetable fiber material forming device according to the present invention, the above-mentioned basic configuration will be more concretely described below. As shown in FIGS. 4 and 5, the material sending means 4 comprises a base portion 17 having a material guide groove 15 on the top surface thereof, and having a dovetail groove 16 communicating with the material guide groove 16; a material accommodating portion 18 provided on the top surface of the base portion 17; a material extruding portion 19 combined so as to reciprocate along the dovetail groove 16 of the base portion 17; and a reciprocation driving mechanism 20 for allowing reciprocation of the material extruding portion 19.

Now, a brief explanation of the vegetable fiber material S will be made. The vegetable fiber material S is, for example, a sheet of paper formed into a preset shape by punching a sheet member made of pomace (vegetable fibers) remaining after squeezing the juice from vegetables such as an apple, bamboo, potato and the like, and in the present embodiment, the vegetable fiber material S is formed by punching into a approximate spoon shape in plan view (a spoon shape having a widen handle when viewed two-dimensionally), and the present invention takes the case where such a vegetable fiber material S is processed by the forming device to produce a paper spoon as an example.

The material accommodating portion 18 of the material sending means 4 is composed of a pair of opposing wall portions 18*a*, 18*a* having vertical recess grooves formed into shapes in agreement with the both end portions of the vegetable fiber material S, and a plurality of vegetable fiber materials S are accommodated with being overlapped with each other between the pair of opposing wall portions 18*a*, 18*a*, whereby the material S is arranged to be dropped into the material guide groove 15 of the base portion 17. On the other hand, the material extruding portion 19 has a projecting strip portion 21 projecting by a small dimension to the material guide groove 15 from the dovetail groove 16 of the base portion 17, and for example, is connected to a tip end of a rod 20*a* of the reciprocation driving mechanism 20 such as a expansion cylinder.

In connection of this, the projecting dimension of the projecting strip portion 21 of the material extruding portion 19 and the dimension of the gap between the bottom surface of the material accommodating portion 18 (opposing wall portions 18*a*, 18*a*) and the material guide groove 15 of the base portion 17 are set to be approximately equal to the thickness of the vegetable fiber material S, with the result that when the reciprocation driving mechanism 20 drives the material extruding portion 19 to advance in the direction of the arrow B, the projecting strip portion 21 extrudes the vegetable fiber material S along the material guide groove 15 to send it out to the material placing portion 3 of the turntable 1 or the first turntable 13. Then, as the material extruding portion 19 retracts, the next vegetable fiber material S drops into the material guide groove 15.

The turntable 1 or the first turntable 13 provided on the downstream side of the base portion 17 in the material sending means 4 is, as shown in FIGS. 1 to 3, provided with the plurality of through holes 2 of the plurality of material placing portions 3 at preset central angles on the outer peripheral side thereof.

The through hole 2 is formed to have a profile slightly smaller than the shape of the vegetable fiber material S, and the rounded shaped portion (the portion corresponding to the spooning portion of a spoon) of the through hole 2 is directed to the inner diameter side. In addition, a stopper guide 22 which is a small projecting strip is provided on the top surface of the turntable 1 or the first turntable 13 and along the through hole 2 of the material placing portion 3. This stopper guide 22 does not exist in the position corresponding to the outer diameter side of the through hole 2, and is formed so as to open outwardly in the radial direction of the turntable. Incidentally, in FIG. 2, the reference numeral 23 denotes a first driving means for intermittently rotating the turntable 1 or the first turntable 13 at the preset central anglevia a rotation shaft 32.

Furthermore, the second turntable 14 is formed to have a larger outer diameter than the first turntable 13, and provided with the plurality of formed article placing portions 8 at preset central angles on the outer peripheral side thereof. The formed article placing portion 8 is a through hole formed into a spoon shape in plan view, and the rounded portion of the through hole (the portion corresponding to the spooning portion of a spoon) is directed to the outer diameter side. Incidentally, the reference numeral 30 denotes a second driving means for intermittently rotating the second turntable 14 at the preset central angle via a rotation shaft 33.

In connection of this, the outer periphery of the second turntable 14 lays under the outer periphery of the first turntable 13 in an overlapping manner with a preset space left therebetween. And at the position where they are overlapped with the preset space left therebetween, the through hole 2 of one material placing portion 3 of the first turntable 13 and one formed article placing portion 8 (through hole) of the second turntable 14 overlap with each other when viewed two-dimensionally. In other words, as the first and the second turntables 13, 14 intermittently rotate (in the direction of the arrow A) individually, each of the material placing portions 3 of the first turntable 13 and each of the formed article placing portions 8 of the second turntable 14 sequentially stop on the line connecting the respective rotation axes of the first and the second turntables 13, 14 when viewed two-dimensionally.

Furthermore, as shown in FIGS. 1, 2, 6A and 7A, between the first and the second turntables 13, 14 is disposed the lower mold 7 in a non-contact state. That is, the lower mold 7 (not shown) is attached to the other fixed member, and provided with a mold hole 24 having a profile approximately equal to the formed article placing portion 8 of the second turntable 2 so as to penetrate therethrough in the up-and-down direction, whereby as the first and the second turntables 13, 14 intermittently rotate individually, the material placing portions 3 and the formed article placing portions 8 of the first and the second turntables 13, 14 sequentially stop at the position of the mold hole 24 of the lower mold 7.

Furthermore, at the position corresponding to the lower mold 7 and above the first turntable 13, there is provided the upper mold 6 of a rectangular plate shape capable of ascending and descending by means of an ascent/descent driving portion 25. And, by making the upper mold 6 descend by means of the ascent/descent driving portion 25, the rounded lower edge of the upper mold 6 passes through the through hole 2 of the first turntable 13 and the mold hole 24 of the lower mold 7, to be inserted into the formed article placing portion 8 (through hole) of the second turntable 14. The details will be described later.

By the way, as shown in FIG. 1, the vegetable fiber material S sent to the material placing portion 3 of the first turntable 13 from the material sending means 4 is to be conveyed to the downstream side (the second turntable 14 side) by intermittent rotation of the first turntable 13 in the direction of the arrow A, and in this course, it is humidified by means of the humidifying means 5. That is, the humidifying means 5 has, for example, a casing provided in the range denoted by the imaginary line so as to allow the first turntable 13 to penetrate therethrough, a spray nozzle for spraying inside the casing, a supply portion for supplying the spray nozzle with water or hot water, thereby humidifying the materials moving in the casing sequentially. Incidentally, excess water remaining in the casing is either discharged to the outside or circulated to the supply portion. In addition, along the outer periphery of the second turntable 14, the warm air drying means 10 is provided on the upstream side, and the cool air drying means 11 is provided on the downstream side. The warm air drying mean 10 has a plurality of blowers for blowing warm air from above the second turntable 14, while the cool air drying means 11 has a plurality of blowers for blowing cool air from above the second turntable 14.

Figure 8:
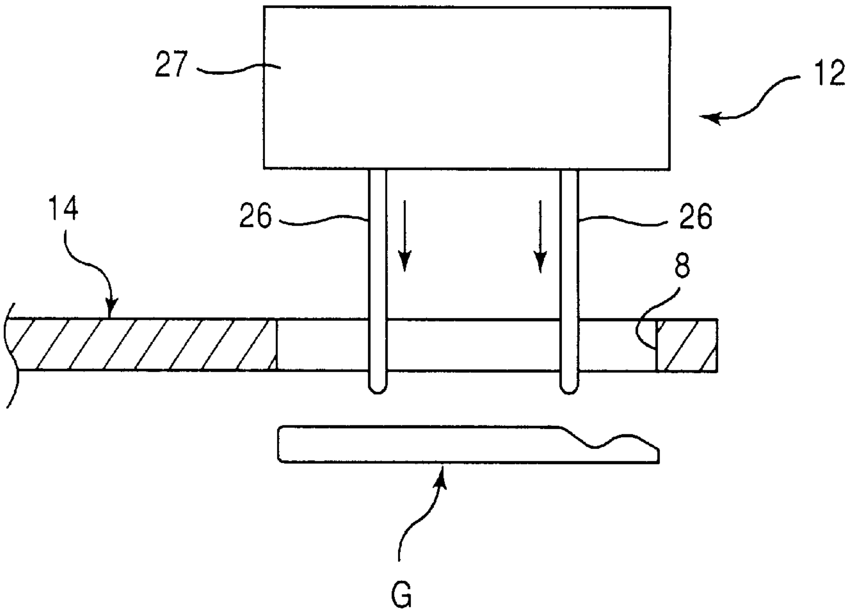
FIG. 8 is a schematic sectional side view showing an example of configuration of a product pickup means for picking up a final product G from the formed article placing portion in the second turntable which is one example of the second conveying means in the present device.

As shown in FIGS. 1 and 8, the product pickup means 12 is provided on the downstream side of the cool air drying means 11 and above the second turntable 14, and has, for example, two rods 26, 26 of a thin shaft shape and an ascent/descent driving portion 27 for making the rods 26, 26 ascend and descend, and by making the rods 26, 26 descend by means of the ascent/descent driving portion 27, the rods 26, 26 penetrate through the formed article placing portion 8 of the second turntable 14.

Next, the operation of the present processing device and a method for processing the vegetable fiber materials according to the present invention will be described. As shown in FIGS. 1, 4 and 5, at first, a plurality of vegetable fiber materials S having a preset shape is formed by punching a sheet of vegetable fibers. Then these vegetable fiber materials S are accommodated in the material accommodating portion 18 of the material sending means 4, and by driving the reciprocation driving mechanism 20, one vegetable fiber material S is sent out to the material placing portion 3 of the first turntable 13 by means of the material extruding portion 19. At this time, the vegetable fiber material S is sent to the material placing portion 3 while sliding on the top surface of the first turntable 13. The vegetable fiber material S is guided to the position above the through hole 2 by means of the stopper guide 22 of the material placing portion 3 and the front end of the vegetable fiber material S abuts on the stopper guide 22, to thereby be positioned accurately at the material placing portion 3.

After completion of sending out of the first vegetable fiber material S, the material extruding portion 19 of the material sending means 14 retracts and the second vegetable fiber material S drops into the material guide groove 15 of the base portion 17, while the first turntable 13 rotates in the direction of the arrow A by the preset central angle so that the next empty material placing portion 3 is shifted to the material sending means 4. Then, as described above, the materials S are sequentially sent out to the material placing portion 3 and the first turntable 13 rotates by the preset central angle, in such a manner that the second vegetable fiber material S is sent to the material placing portion 3 of the first turntable 13 by means of the material sending means 4, and the first turntable rotates by the present central angle .

In connection of this, the vegetable fiber materials S pass through the humidifying means 5 while intermittently rotating together with the first turntable 13, and at this time, the vegetable fiber materials S are humidified by spraying hot water of 20° C. to 60° C., preferably 35° C. to 45° C. with the humidifying means 5. And the water content of the vegetable fiber material S directly after humidification is set at 50% to 90%, and the temperature is set at 30° C. to 50° C. As a consequence of this, it is possible to add appropriate flexibility to the vegetable fiber material S and the freedom of change in shape is improved.

Figure 6A:
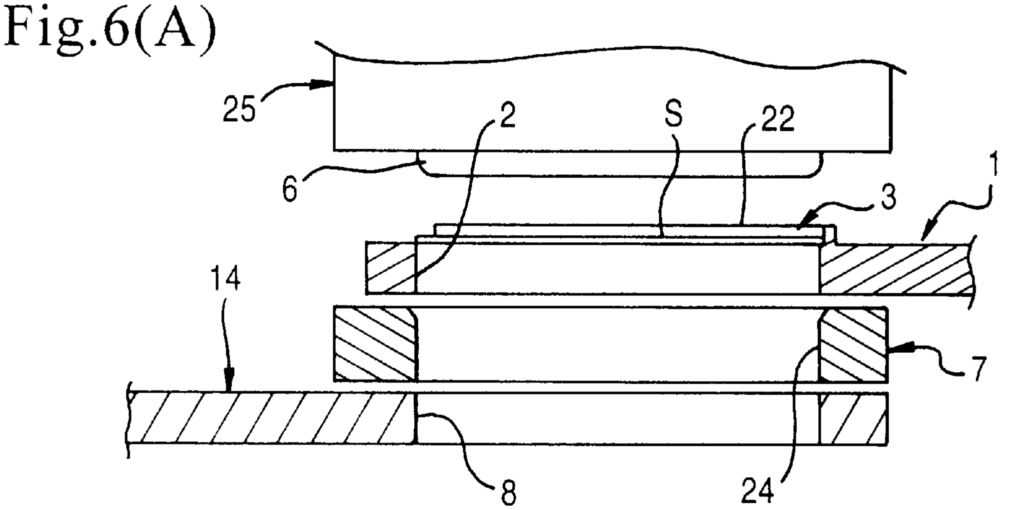
FIG. 6A is a schematic sectional side view showing the state that a vegetable fiber material S is placed on the material placing portion in the turntable.
Figure 6B:
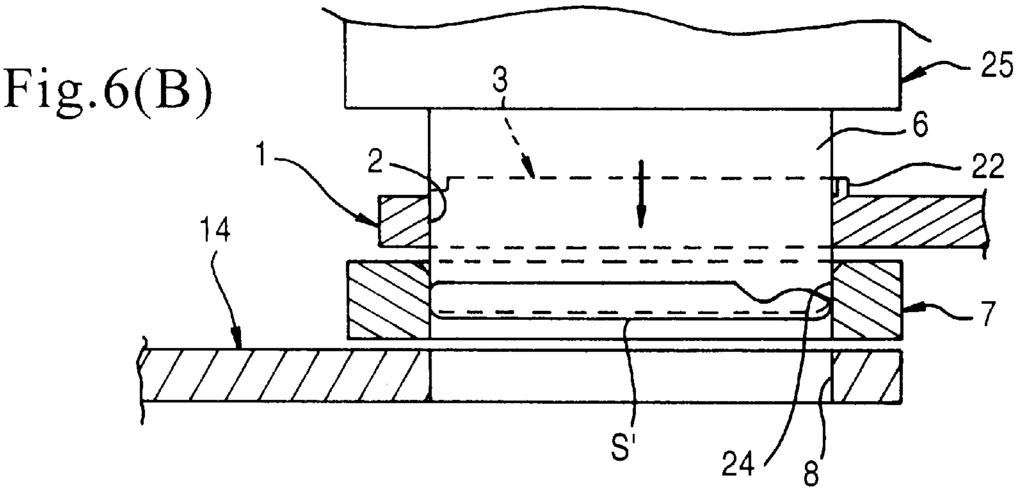
FIG. 6B is a schematic sectional side view showing the state that the upper mold comes down to push the vegetable fiber material S from above and squeeze the same into a mold hole of the lower mold, thereby forming an intermediate formed article S'.
Figure 6C:
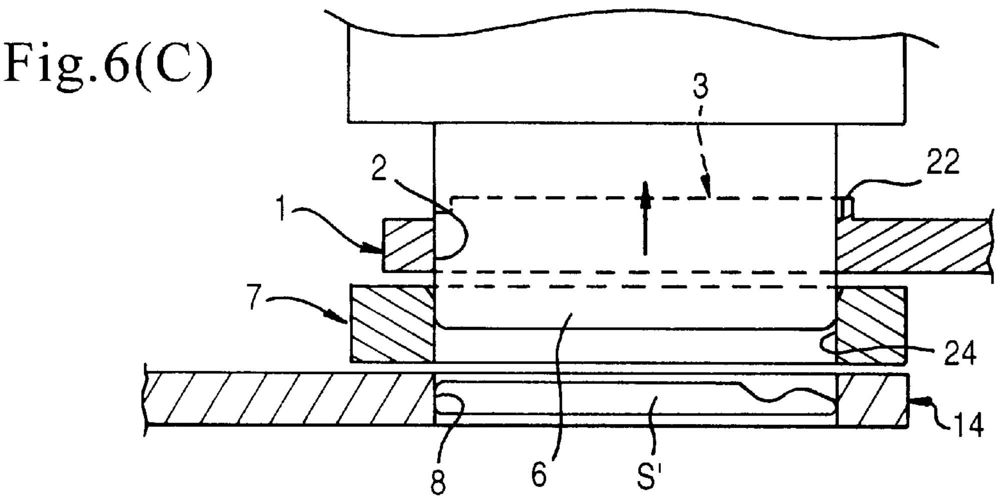
FIG. 6C is a schematic sectional side view showing the state that the intermediate formed article S' is squeezed into a formed article placing portion in a second turntable which is a second conveying means by descent of the upper mold.
Figure 7A:
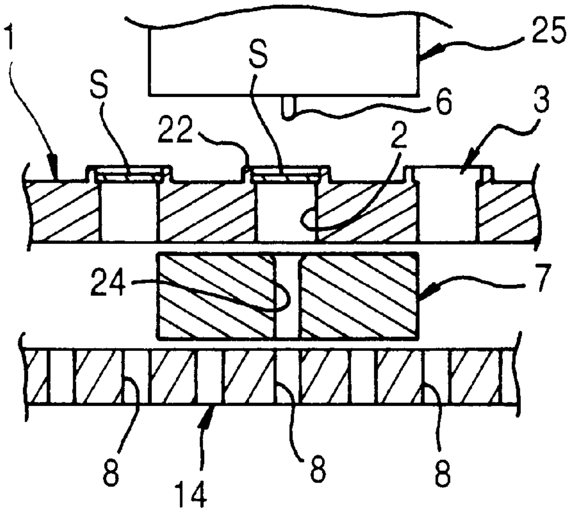
FIG. 7A is a schematic section view along the line 7A—7A in FIG. 6A.
Figure 7B:
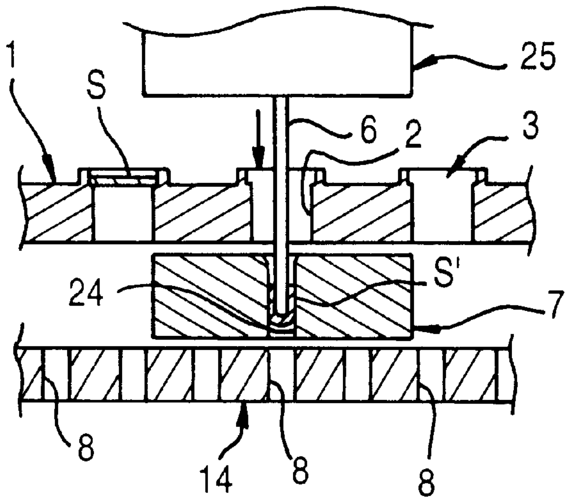
FIG. 7B is a schematic section view along the line 7B—7B in FIG. 6B.
Figure 7C:
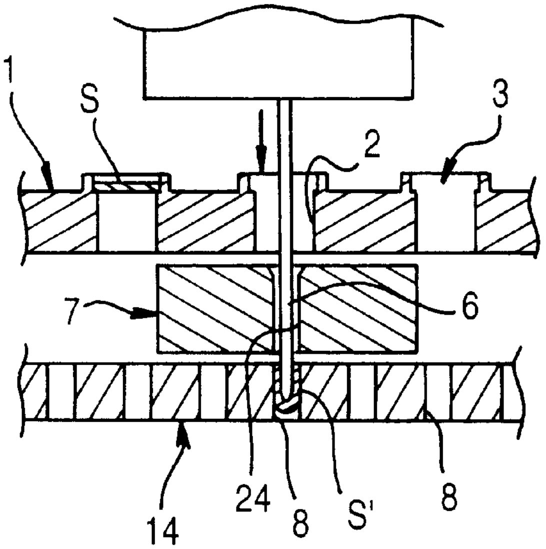
FIG. 7C is a schematic section view along the line 7C—7C in FIG. 6C.

After passing through the humidifying means 5, due to the intermittent rotation of the first turntable 13, as shown in FIGS. 6A and 7A, the vegetable fiber material S is sent between the upper and the lower molds 6, 7, and as shown in FIGS. 6B, 6C and FIGS. 7B and 7C, the upper mold 6 descends by means of the ascent/descent driving portion 25 to push the vegetable fiber material S from above. At this time, the vegetable fiber material S thus pushed by the upper mold 6 goes out the material placing portion 3 downwardly to be squeezed into the mold hole 24 of the lower mold 7. That is, the upper mold 6 and the lower mold 7 cooperates to bend-draw the vegetable fiber material S into the intermediate shape of having a U-shaped transverse cross section. Further, the intermediate formed article S' bend-drawn into the intermediate shape is pushed by the upper mold 6 to go out the mold hole 24 of the lower mold 7 downwardly, and then squeezed into the formed article placing portion 8 of the second turntable 14 to be held therein.

Incidentally, at the time of bend-drawing, if the water content of the vegetable fiber material S is less than 50%, cracking is likely to occur on the vegetable fiber material S, while on the other hand, the water content of more than 90% is excess and difficult in practice. Furthermore, if the temperature of the vegetable fiber material S is less than 30° C., the flexibility of the vegetable fiber material S is insufficient, making it difficult to free deformation of the vegetable fiber material S in winter, while on the other hand, it is difficult to keep the temperature above 50° C. in winter.

After that, the upper mold 6 ascends and as shown in FIG. 1, the first turntable 13 rotates in the direction of the arrow A by the preset central angle so that the next vegetable fiber material S is sent between the upper and the lower molds 6, 7, and in addition, the second turntable 14 rotates in the direction of the arrow A by the preset central angle so that the next empty formed article placing portion 8 is shifted and positioned under the mold hole 24 of the lower mold 7. Then, as described above, the upper mold 6 sequentially pushes the humidified vegetable fiber materials S to bend-draw the same together with the lower mold 7 and the formed intermediate formed articles S' are sequentially sent to the second turntable 14 in such a manner that the upper mold descends and the vegetable fiber material S is bend-drawn into the intermediate shape by the upper and the lower molds 6, 7 to be held in the formed article placing portion 8 of the second turntable 14.

The intermediate formed articles S' pass through the warm air drying means 10 by means of intermittent rotation of the second turntable 14, and at this time, the intermediate formed article S' is rapidly dried in contact with the warm air of 90° C. to 120° C. and thereby solidified into the final shape. After that, the second turntable 14 intermittently rotates and the article having the final shape is cool-air-dried by the cool air drying means 11 to be finished into the product G. After that, as shown in FIGS. 1 and 8, the product G having moved to the position under the product pickup means 12 is pushed by the lowered two rods 26, 26 to come off the formed article placing portion 8 of the second turntable 14 downwardly and then be collected.

Figure 9:
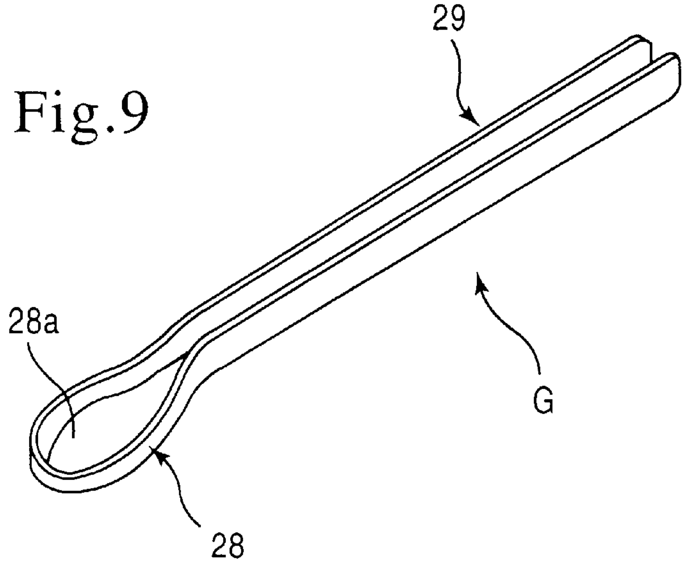
FIG. 9 is a schematic perspective view showing the shape of a spoon product which is one example of the final product G.

The product G thus produced is a paper spoon as shown in FIG. 9. This spoon consists of a spooning portion 28 having a concave portion **28*a* and a handle portion 29 having a U-shaped transverse cross section, and can be used satisfactorily in such a manner that powder coffee, sugar or the like is spooned and hot water is mixed by the spooning portion 28. In addition, if they are disposed by reclamation after use, the vegetable fibers will bio-degrade (decay) and will no longer remain, and even if the products are disposed by burning, harmful dioxins will not occur. Although the case where the product G is a spoon is exemplified in the present embodiment, it is also possible to produce other tableware such as a fork, dish, cup and lunch box. That is, the shape of the material placing portion 3 (through hole 2 and the stopper guide 22) of the first turntable 13, the shapes of the upper mold 6 and the lower molds 7, the shape of the formed article placing portion 8 of the second turntable 14** and the like may be designed in accordance with the shape of the tableware to be produced.

Figure 10:
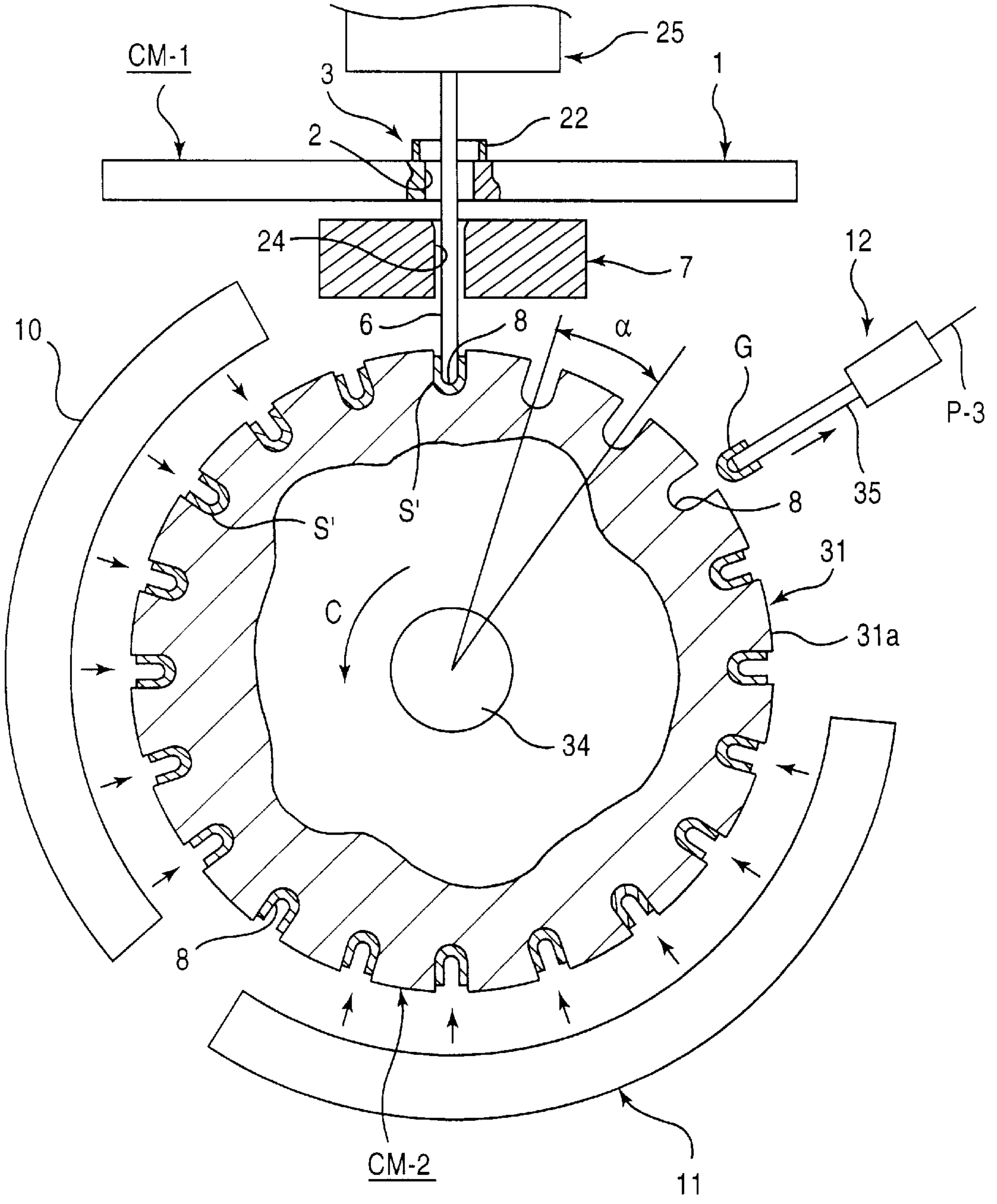
FIG. 10 is a schematic sectional side view of a forming device in which an example of the second embodiment, namely, an example with different configuration of the second conveying means is combined with respect to the forming device for vegetable fiber materials according to the present invention.

By the way, FIG. 10 shows the second embodiment of the processing device for vegetable fiber materials according to the present invention, and this processing device has the second conveying means CM-2 of another structure. That is, the processing device comprises the material sending means 4, the turntable 1, the humidifying means 5 and the upper and the lower m olds 6, 7 as explained in FIGS. 1 to 7, and further comprises the second conveying means CM-2 as will be described below.

This second conveying means CM-2 comprises a roll member 31 of a cylindrical column or cylinder shape provided with the plurality of formed article placing portions 8 at the preset central angles on an outer peripheral surface 31 a and a second driving portion (see FIG. 2 for reference) for intermittently rotating the roll member 31 at the preset central angle in the direction of the arrow C via a rotation shaft 34, wherein the rotation axis of the roll member 31 is defined as the direction perpendicular to the rotation axis of the turntable 1.

Furthermore, the formed article placing portion 8 of the roll member 31 is formed into a recess groove shape for holding the intermediate formed article S' bend-drawn into the intermediate shape by the upper and the lower molds 6, 7, and formed along the longitudinal axial direction, and configured so that each of the formed article placing portions 8 of the roll member 31 rotating intermittently is sequentially stopped at the position directly below the mold hole 24 of the lower mold 7.

Furthermore, in this processing device, the warm air drying means 10 is provided on the upstream side and the cool air drying means 11 is provided on the downstream side along the outer peripheral surface 31 a of the roll member 31, and the product pickup means 12 is provided on the downstream side of the cool air drying means 11. As this product pickup means 12, for example, those having the configuration that an expandable cylindrical rod 35 is caused to approach the product G, and the product G is adsorbed by suctioning the air from the tip end of the rod 35, whereby the product G is collected from the formed article placing portion 8 (vacuum type) are used.

In connection of this, the material sequentially sent to the material placing portion 3 of the turntable 1 (in the manner as described above) and then humidified (water content of 50% to 90% and temperature of 30° C. to 50° C.) is pushed by the upper mold 6 and bend-drawn by the upper and the lower molds 6, 7, and then the processed intermediate formed articles S' are sequentially held within the formed article placing portions 8 of the roll member 31, warm-air-dried (90 C. to 120 C.), and cool-air-dried to be finished into the products G having the final shape, and then collected by the product pickup means 12.

Figure 11:
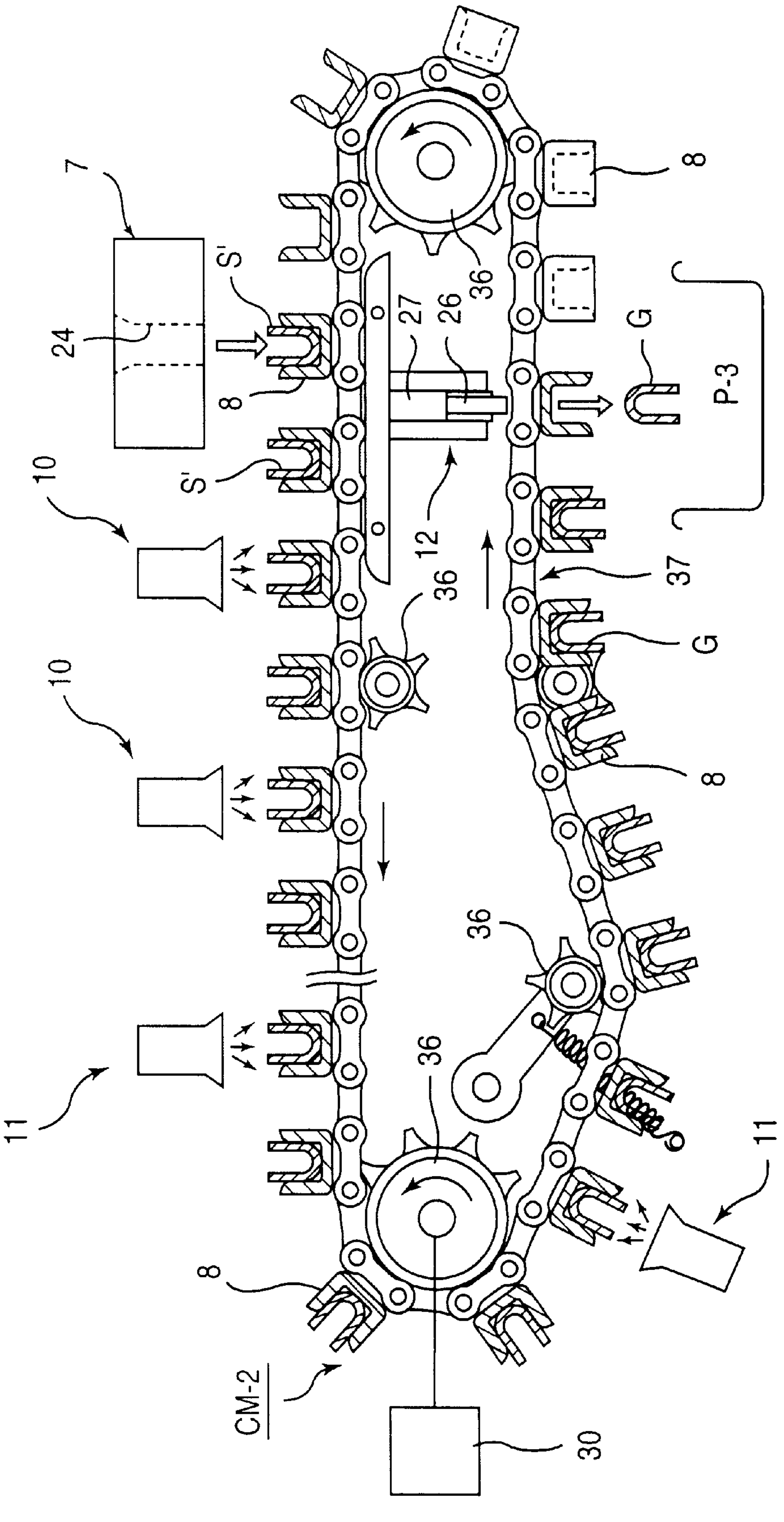
FIG. 11 is a schematic sectional side view of a forming device in which an example of the third embodiment, namely, an example with further different configuration of the second conveying means is combined with respect to the forming device for vegetable fiber materials according to the present invention.

Next, FIG. 11 shows the third embodiment of the present invention, which comprises the second conveying means CM-2 of yet another structure. That is, this processing device comprises the material sending means 4, the turntable 1, the humidifying means 5 and the upper and the lower molds 6, 7 as explained in FIGS. 1 to 7, and further comprises the second conveying means CM-2 (as will be described below).

This second conveying means CM-2 comprises an endless chain 37 stretched by a plurality of sprockets 36, the plurality of formed article placing portions 8 annexed to the outer peripheral side of the chain 37 at preset pitches and the second driving means 30 for intermittently rotating the chain 37 at the preset pitch via the sprocket 36. Furthermore, this formed article placing portion 8 is a thin box shape having a recess portion opening outwardly. And, each of the formed article placing portions 8 of the chain 37 rotating intermittently is configured to sequentially stop at the position directly below the mold hole 24 of the lower mold 7.

Furthermore, in this processing device, the warm air drying means 10 is provided on the upstream side and the cool air drying means 11 is provided on the downstream side along the outer peripheral side of the chain 37, and the product pickup means 12 is provided on the downstream side of the cool air drying means 11. As this product pickup means 12, for example, those having the rods 26 provided so as to be capable of ascending/descending (as described in FIG. 8) and the ascent/descent driving portion 27 for causing the rods 26 to ascend/descend are used.

In this case, the bend-drawn intermediate formed articles S' are sequentially held within the formed article placing portions 8 of the chain 37, warm-air-dried and cool-air-dried to be finished into the products G having the final shape, and then the rod 26 of the product pickup means 12 penetrates through a small hole provided in the formed article placing portion 8 to extrude the product G for collection. Incidentally, the product pickup means 12 may be the vacuum type one as described in FIG. 10.

Incidentally, the present invention is not limited to the above-described embodiments, and for example, it is also possible to make the formed article placing portion 8 (through hole) of the second turntable 14 described in FIG. 1 into a shape slightly narrowing in the lower part. As a consequence of this, the intermediate formed article S' becomes unlikely to go out of the through hole due to the strong air pressure from above at the time of drying. Furthermore, it is also possible to make the formed article placing portion 8 of the second turntable 14 into a recess groove shape as well as the through hole shape. In this case, the product pickup means 12 can be the vacuum type one as described in FIG. 10.

In the device and method for forming vegetable fiber materials according to the present invention, the illustrated specific working examples provide configuration for forming the spoon product G from the vegetable fiber material S made of pomace of an apple, bamboo, potato and the like, however, the present invention is not limited to the above-mentioned spoon product G and is applicable without any modification to the configuration in which tableware such as a fork, dish, cup or lunch box, or other structural products including containers having a deep-drawn structure, and additionally daily household goods having the above structural portion are formed by bend-drawing.

Industrial Applicability

According to the device and method for forming vegetable fiber materials of the present invention, the following effects are achieved from the above-mentioned configurations.

In the present invention, according to the inventions defined by claims 1 to 3, the significant effect is achieved, for example, in the point that mass and effective production of worked products such as tableware is enabled by using the vegetable fiber material S made of pomace of an apple, bamboo, potato and the like.

Furthermore, in the present invention, according to the invention defined by claim 3, by configuring the first and the second conveying means with the first and the second turntables 13, 14, such effects are achieved that the whole structure of the device is simple and fabrication thereof is easy.

Furthermore, in the present invention, according to the invention defined by claim 4, sending (supply) of the vegetable fiber materials S and picking up (collection) of the final products G are automated so that it is possible to achieve automation throughout the process. This is significantly effective in the point of reduction of number of workers.

Furthermore, in the present invention, according to the invention defined by claim 5, it is possible to place the vegetable fiber materials S on the material placing portions 3 of the turntable 1 reliably and accurately. In particular, it is possible to place the vegetable fiber materials S automatically and sequentially sent from the material sending means 4 at a preset position without causing a positional deviation. Therefore, the humidified vegetable fiber material S is bend-drawn into the preset intermediate shape, so that a defective will not be produced.

Furthermore, in the present invention, according to the invention defined by claim 7, tableware of disposable type which is consumed in bulk can be produced with high efficiency. Moreover, since this tableware is made of vegetable fibers which will bio-degrade, if the bulk garbage after use is disposed by reclaiming, it will not cause environmental pollution, and if the bulk garbage is disposed by burning, harmful dioxins will not occur, which contributes to the environmental conservation.

Furthermore, in the present invention, according to the invention defined by claim 8, a significant effect is achieved in the point that the worked products can be produced in volume by using the vegetable fiber materials made of, for example, pomace of an apple, bamboo, potato and the like.

Furthermore, in the present invention, according to the invention defined by claim 9, it is possible to impart the vegetable fiber material S with the flexibility, and hence, it is possible to prevent the vegetable fiber material S from cracking at the time of bend-drawing and to freely change the shape of the material.

Furthermore, in the present invention, according to the invention defined by claim 10, since pomace of vegetables such as an apple, bamboo, potato and the like is used, it is possible to achieve recycling of resources while conducting waste disposal, which contributes to resource savings.

What is claimed is:

1. A device for forming vegetable fiber materials in which a sheet member of vegetable fibers is punched into a preset shape to form a vegetable fiber material, and a final product is formed from the vegetable fiber material, the device comprising:

a first conveying means for sequentially and intermittently conveying the vegetable fiber material from a supply position to a bend-drawing position;

a humidifying means for humidifying the vegetable fiber material to give it a preset water content during the period of conveyance by the first conveying means;

a bend-drawing means for bend-drawing the vegetable fiber material humidified by the humidifying means into an intermediate formed article at the bend-drawing position;

a second conveying means for conveying the intermediate formed article bend-drawn by the bend-drawing means from the bend-drawing position to a product pickup position;

a warm air drying means for solidifying with warm air the intermediate formed article into a final shape during the period of conveyance by the second conveying means; and a cool air drying means for drying with cool air the intermediate formed article after warm-air-drying by the warm air drying means to finish into the product.

2. A device for forming vegetable fiber materials in which a sheet member of vegetable fibers is punched into a preset shape to form a vegetable fiber material, and a final product is formed from the vegetable fiber material, the device comprising:

a turntable as a first conveying means comprising a plurality of material placing portions with a through hole for placing the vegetable fiber material provided at preset central angles, the turntable intermittently rotating at the preset central angle;

a humidifying means for humidifying the vegetable fiber material intermittently rotating by means of the turntable;

a bend-drawing means provided above the turntable, comprising an upper mold for sequentially pressing the humidified vegetable fiber material from above and a lower mold, the lower mold having a mold hole through which the upper mold is to penetrate and cooperating with the upper mold for bend-drawing the vegetable fiber material pushed by the upper mold and penetrating through the through hole of the turntable downwardly;

a second conveying means provided with a plurality of formed article placing portions for holding an intermediate formed article bend-drawn into an intermediate shape as a result of being pushed by the upper mold and penetrating through the lower mold downwardly, the second conveying means intermittently shifting the formed article placing portion;

a warm air drying means for drying with warm air the intermediate formed article intermittently sent by the second conveying means to solidify it into a final shape; and a cool air drying means for drying with cool air the intermediate formed article after warm-air-drying by the warm air drying means to finish into the product.

3. A device for forming vegetable fiber materials in which a sheet member of vegetable fibers is punched into a preset shape to form a vegetable fiber material, and a final product is formed from the vegetable fiber material, the device comprising:

a first turntable comprising a plurality of material placing portions with a through hole for placing the vegetable fiber material provided at preset central angles, the first turntable intermittently rotating at the preset central angle;

a humidifying means for humidifying the vegetable fiber material intermittently rotating by means of the first turntable;

a bend-drawing means provided above the first turntable, comprising an upper mold for sequentially pressing the humidified vegetable fiber material from above and a lower mold, the lower mold having a mold hole through which the upper mold is to penetrate and cooperating with the upper mold for bend-drawing the vegetable fiber material pushed by the upper mold and penetrating through the through hole of the first turntable downwardly;

a second turntable provided with a plurality of formed article placing portions for holding an intermediate formed article bend-drawn into an intermediate shape as a result of being pushed by the upper mold and penetrating through the lower mold downwardly, the second turntable intermittently rotating at the preset central angle;

a warm air drying means for drying with warm air the intermediate formed article intermittently sent by the second turntable to solidify it into a final shape; and a cool air drying means for drying with cool air the intermediate formed article after warm-air-drying by the warm air drying means to finish into the product.

4. The device for forming vegetable fibers according to any one of claims 1 to 3, wherein a material sending means for sequentially sending out the vegetable fiber material formed into a preset shape by punching to the material placing portion of the turntable and a product pickup means for picking up the finished product from the formed article placing portion of the second conveying means are provided.

5. The device for forming vegetable fibers according to any one of claims 1 to 3, wherein a stopper guide of a small projecting strip is provided on the top surface of the turntable and along the through hole of the material placing portion.

6. The device for forming vegetable fibers according to any one of claims 1 to 3, wherein the vegetable fiber material is made of pomace obtainable by squeezing vegetables.

7. The device for forming vegetable fiber materials according to any one of claims 1 to 3, wherein the product is selected from the group consisting of tableware and containers having a deep-drawn structural portion.

8. The device according to claim 7, wherein the tableware is selected from the group consisting of a spoon, fork, dish, cup, and lunch box.

* * * * *